(12) United States Patent
Lagares Corominas (10) Patent No.: US 7,654,194 B2
(45) Date of Patent: Feb. 2, 2010

(54) FOOD COOKING INSTALLATION

(75) Inventor: Narcis Lagares Corominas, Girona (ES)

(73) Assignee: Metalquimia, S.A., Girona (ES)

( * ) Notice: Subject to any disclaimer, the term of this patent is extended or adjusted under 35 U.S.C. 154(b) by 711 days.

(21) Appl. No.: 10/515,040

(22) PCT Filed: May 20, 2003

(86) PCT No.: PCT/ES03/00229

§ 371 (c)(1),
(2), (4) Date: Oct. 18, 2005

(87) PCT Pub. No.: WO03/096815

PCT Pub. Date: Nov. 27, 2003

(65) Prior Publication Data

US 2006/0083836 A1    Apr. 20, 2006

(30) Foreign Application Priority Data

May 20, 2002    (ES)    ................................. 200201147

(51) Int. Cl.
*A47J 37/12*    (2006.01)
*A23C 3/00*    (2006.01)
(52) U.S. Cl. ............................. 99/355; 99/352; 99/353; 99/354; 99/325; 99/326; 99/327; 99/328; 99/516; 99/330; 99/402; 426/520; 426/521; 426/522; 426/524; 426/509; 165/104.14; 165/48.1; 165/232; 165/240; 62/82; 62/61; 62/282; 62/185

(58) Field of Classification Search ............... 99/352–5, 99/325–30, 402, 516, 534; 426/520–524, 426/506, 509; 165/61, 104.14, 48.1, 232, 165/240; 62/82, 61, 282, 185
See application file for complete search history.

(56) References Cited

U.S. PATENT DOCUMENTS 4,505,192 A    3/1985    Dreano
(Continued)

FOREIGN PATENT DOCUMENTS

EP    0 292 417 B1    11/1988
(Continued)

OTHER PUBLICATIONS

International Search Report for PCT International Application No. PCT/ES03/00229, mailed Sep. 26, 2003.

*Primary Examiner*—Shawntina Fuqua
(74) *Attorney, Agent, or Firm*—RatnerPrestia (57) ABSTRACT

The invention relates to a food cooking installation comprising numerous cooking tanks which are used to receive the food items to be cooked; means of loading/unloading the food items into/from said cooking tanks; and means of conveying, driving and storing liquids, which are used to connect a heated liquid container, a cooled liquid container and a piped water delivery point with the aforementioned cooking tanks. In this way, the tanks can be filled and emptied independently and the food items contained therein can be subjected to successive baths for different periods of time and at different temperatures, at least one of the baths being a cooking bath and the other a cooling bath. According to the Invention, each of the aforementioned cooking tanks comprises at least one lateral opening which is equipped with impervious sealing means and which is used to load/unload the food items using the above-mentioned loading/unloading means.

20 Claims, 7 Drawing Sheets

U.S. PATENT DOCUMENTS

| | | |
|---|---|---|
| 5,005,471 A | 4/1991 | Dreano |
| RE33,712 E * | 10/1991 | Mariotti ...................... 99/330 |
| 5,398,600 A | 3/1995 | Madsen et al. |
| 5,685,125 A | 11/1997 | Cattelli et al. |
| 6,085,639 A | 7/2000 | Dreano |

FOREIGN PATENT DOCUMENTS

| | | |
|---|---|---|
| EP | 0 334 782 A1 | 9/1989 |
| EP | 0 691 272 B1 | 4/2000 |
| EP | 0 995 386 B1 | 4/2000 |
| ES | 2 037 458 | 6/1993 |
| ES | 2 039 687 | 10/1993 |
| ES | 2 147 591 | 9/2000 |
| FR | 2 662 998 | 12/1991 |

* cited by examiner

FOOD COOKING INSTALLATION

FIELD OF THE INVENTION

This invention concerns an installation for cooking food, more specifically, an installation for batch-cooking meat products in stacked moulds or cages.

The installation of the invention is useful to the cooked food preparation industry, such as jam and sausages etc, and in other industries where cooking operations are carried out in large boilers, such as in the preserved food industry.

This application is a U.S. National Phase Application of PCT International Application PCT/ES03/00229 filed May 20, 2003.

BACKGROUND OF THE INVENTION

Various foodstuffs, packed, moulded or cold cuts are prepared using a cooking stage, which is usually carried out according to two different systems: by immersion in a hot liquid, generally water held in a boiler; or through the action of steam inside a cooking vessel. Each of these two methods has both advantages and disadvantages, which are examined below.

Cooking by immersion in hot water has the advantage of presenting excellent thermal interchange and heat transmission, which is translated into shorter cooking times. It also provides a good uniformity of temperature inside the boiler, which facilitates regulation. Its main disadvantage is inconvenient loading, since this type of boiler opens at the top. This thus requires, for example, bridge cranes to raise the batch of food and lower it into the boilers forming layers. This will require a building with a considerable ceiling height and, the larger the batches handled in order to reduce loading and unloading times, the higher the required ceiling height.

ARMOR-INOX, S.A. patent EP-A-0334782 described a cooking installation for cooking foodstuffs by immersion in a hot liquid, followed by at least one immersion in a cold liquid in order to remove the cooled products. The installation consists of a series of boilers, each with an opening at the top for loading and unloading, together with an inlet and outlet for the liquids, the means of heating in order to obtain a hot liquid stored in another tank and a connection to the mains water supply. The hot and cold liquids, together with the running water are distributed by means of piping to the respective boiler inlets in order to fill them and to collect the liquids from the corresponding outlets so that the boilers can be emptied and the liquids returned to their respective tanks. The installation includes an emptying pump for each boiler, which permits the independent filling or emptying of each boiler. U.S. Pat. No. 6,085,639, also belonging to ARMOR-INOX, S.A. describes an installation that is very similar to the previous one, in which the independent filling and emptying operations for each boiler are carried out via the same inlet/outlet pipe by means of a reversible pump. Neither of these two cited patents describes access to the boilers from a side opening that can be hermetically sealed.

The cooking via steam inside a cabin has the advantage of being able to employ a side access for loading and unloading the cabins, which will eliminate the requirement for high ceiling heights because the batches of food are placed on trolleys, which then enter the cooking cabins. In addition, the use of steam involves low energy costs and simple maintenance. However, this type of cooking has the disadvantage of inferior interchange and transmission of heat with respect to immersion in hot liquid, which will therefore require longer cooking times. Moreover, obtaining a uniform temperature inside the cabin is more difficult and requires very precise steam distribution to prevent irregular cooking of the pieces in the same batch.

The objective of this invention is to provide an installation for cooking food that benefits from the advantages of both the systems described above but, at the same time, avoids the associated main disadvantages of each.

DESCRIPTION OF THE INVENTION

In accordance with this invention, the previous objective is obtained by providing a food cooking installation, of the type comprising numerous cooking tanks to receive the food items to be cooked; the means of loading/unloading the food items into/from the said cooking tanks; the means of heating the liquid associated with a heated liquid tank; the means of cooling the liquid associated with a cooled liquid tank and a connection to the mains water supply; with the means of conveying, driving and storing the liquids, which are connected to a heated liquid container, a cooled liquid container and a piped mains water delivery point with the previously described cooking tanks so that the said cooking tanks can be independently filled and emptied, with the said liquids being optionally returned to their respective tanks, and the contained food items can be subjected to successive baths for different periods of time and at different temperatures, with at least one of the said baths being a cooking bath and another for cooling, with the installation characterised because each of the said cooking tanks comprising at least one side opening with the means for being hermetically sealed, through which the food items can be loaded/unloaded by the said means of loading.

The cited side opening for each cooking tank is comprised of the substantially vertical closing panel with sideways movement in the fashion of a sliding door to allow/prevent entry inside the cooking tanks, together with frontal movement towards a frame that surrounds this side opening in the tank in order to apply pressure to the means of hermetically sealing the tank between the closing panel and the frame. The said means of hermetically sealing the opening comprises at least one device to secure the panel in the said closed position and preventing it from being opened while the environmental conditions inside the tank are not suitable (in general, it is necessary for the tank to be empty of liquid), where the safety system is preferably a double safety system, comprising, for example, a mechanical device, such as a float and an auxiliary device, for example, electronic, such as a level sensor, which detects the presence of liquid inside the cooking tank and prevents the closing panel from being opened if the said liquid is present inside the tank.

The fact that there is at least one side opening for the loading/unloading of each cooking tank allows the use of the means of loading that operate from ground level, eliminating the need for a high ceiling height and preventing the risks involved in overhead transport of the loads using cranes. Thus, the said means of loading comprises at least one transport/lifting trolley fitted with the handling means capable of holding, lifting and lowering a food item batch and of transferring the said food item batch inside one of the cooking tanks or to remove it through the said opening. This transport/lifting trolley, of which there is at least one, will move along a path and, according to a basic construction example, the said cooking tanks are arranged to form a row along one side of the said path, with their openings aligned in a plane parallel to the same, although other layouts are also possible. The cooking tanks are installed in groups of two, one next to the other at the sides, leaving a separation space between two groups of two cooking tanks that is sufficient to permit at least one complete opening movement of one of the cooking tanks adjacent to one of the said separation spaces. Some of the said means of conveying, driving and storing liquids are arranged on one free side wall of each cooking tank which, in the intermediate tanks is adjacent to the said separation space, and associated with inlet/outlet pipes for liquids to and from the cooking tank through the said free side wall.

Preferably, the trolley is self-propelled and moves over rails along the said path and able to make selective stops in front of any of the cooking tanks that is selected for introducing or removing a batch of food items under the control of programmable electronic means. The said means of handling associated with the trolley comprises a horizontal support element connected to a vertical lift device, together with transversal guides mounted on the said horizontal support element, with the said lift device being able to place the said horizontal support element at various suitable heights so that the said transversal guides can be aligned with some corresponding guides installed on one or more levels inside the cooking tank. For complete automation of the loading/unloading operations, the said transversal guides for the means of handling the trolley are associated with the means of drive that cooperate with the means of drive associated with the said cooking tank guides for introducing or removing a batch of food items into/from the same. The cited means of drive for the lower cooking tank guides are driven by motors located outside on the said free side wall of each cooking tank. These motors are coupled to the means of drive through the said free side walls by means of adequately sealed transmissions.

The installation in accordance with this invention comprises numerous loading platforms adapted for use by the means of handling the trolley, including a specific configuration suitable for coupling by the said means of drive. A batch of food items can be deposited on each of the platforms, either arranged in stacked moulds or using a cage in which the food items are arranged in moulds, packages or individual wrappers, which are normally separated into layers by means of spacer plates. When employing batches in stacked moulds, the installation can optionally include a demoulding station for demoulding the food items cooked in the cooking tanks. The rails along which the trolley moves extends to the said demoulding station, so that the trolley can remove and transport the said batches of cooked food items from any of the cooking tanks to the demoulding station. Preferably, the installation will also include at least one loading platform storage station that is accessible to the trolley moving along the rails.

In order to optimise energy costs, each cooking tank includes at least one steam inlet connected to a steam supply via a valve. The steam is distributed inside the cooking tank by means of perforated piping to mix the said steam, whether it is a heated liquid from the said heated liquid tank or mains supply water from the mains supply water connection, or a mixture of the two, inside the cooking tank. In this way, the liquid's temperature is raised to the required level under the control of programmable electronic means. For example, a pre-cooking bath may be carried out by filling the cooking tank with mains supply water at environmental temperature and raising its temperature inside the cooking tank by bubbling steam through it until an adequate level is achieved of, for example, 50-60° C., or a cooking bath by filling the cooking tank with liquid, generally water, that has been previously heated by the means of heating to approximately 40-50° C. and then raising its temperature inside the cooking tank be bubbling steam through it until an adequate level is achieved for the desired heat treatment, for example, approximately 70-80° C. A liquid recirculation system has been planned, driven by a pump, between a tank's inlet and outlet in order to achieve temperature uniformity inside the tank and thus prevent any possible temperature differences through the various areas inside the tank.

With this arrangement, the food item cooking installation of this invention benefits from the advantages of the immersion cooking system, such as ease of obtaining uniform temperature inside the tank, with the advantages of the steam action system, such as loading through side openings and significant economic savings.

A BRIEF EXPLANATION OF THE DRAWINGS

A detailed description of an example of this invention is provided below, with reference to the attached drawings, in which.

DETAILED DESCRIPTION OF SOME CONSTRUCTION EXAMPLES

Figure 1:
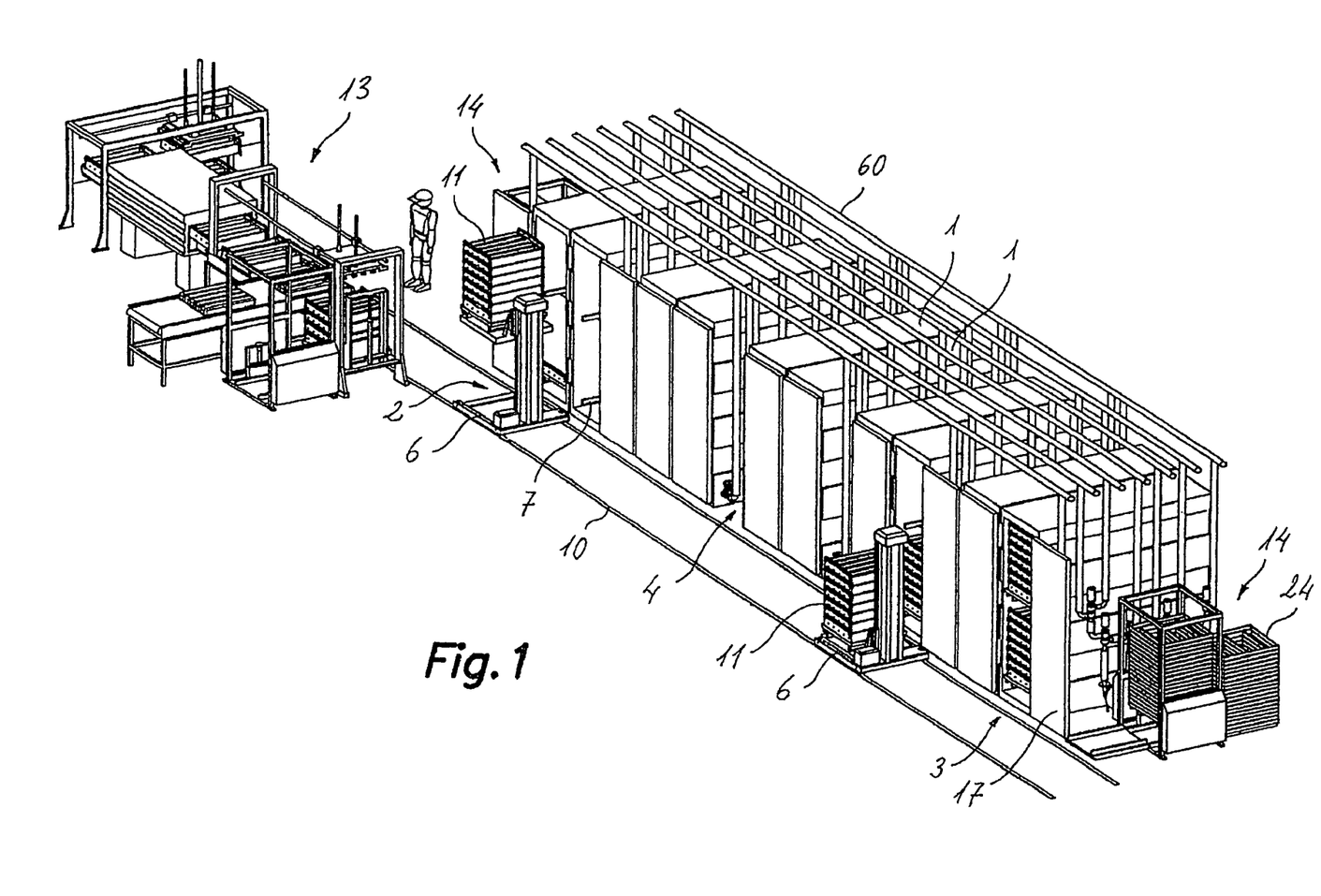
FIG. 1 is a perspective view of an installation according to a construction example of this invention.
Figure 2:
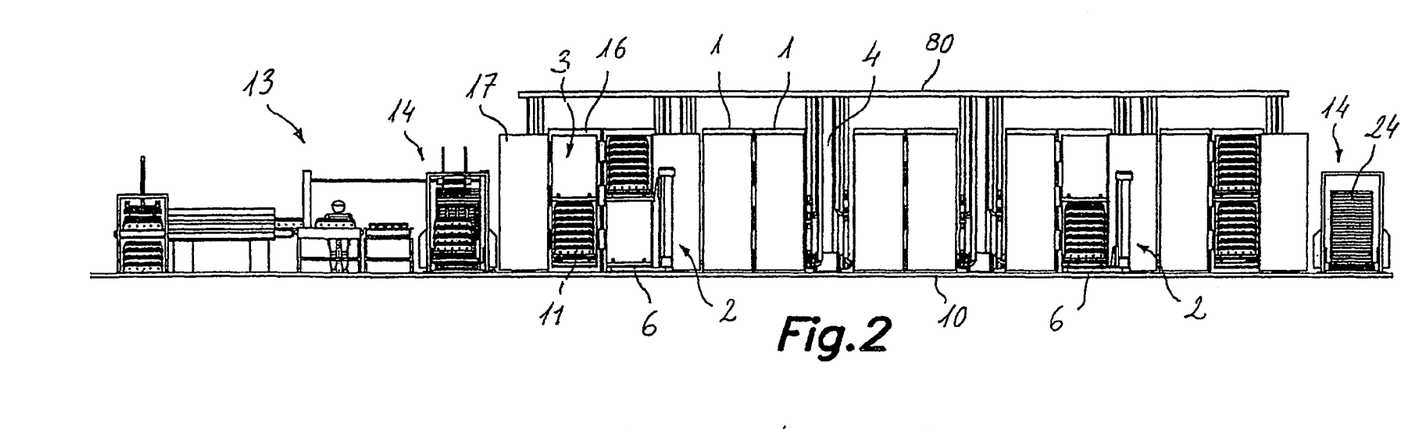
FIGS. 2 and 3 are the front and plan elevations, respectively of the installation shown in FIG. 1.
Figure 3:
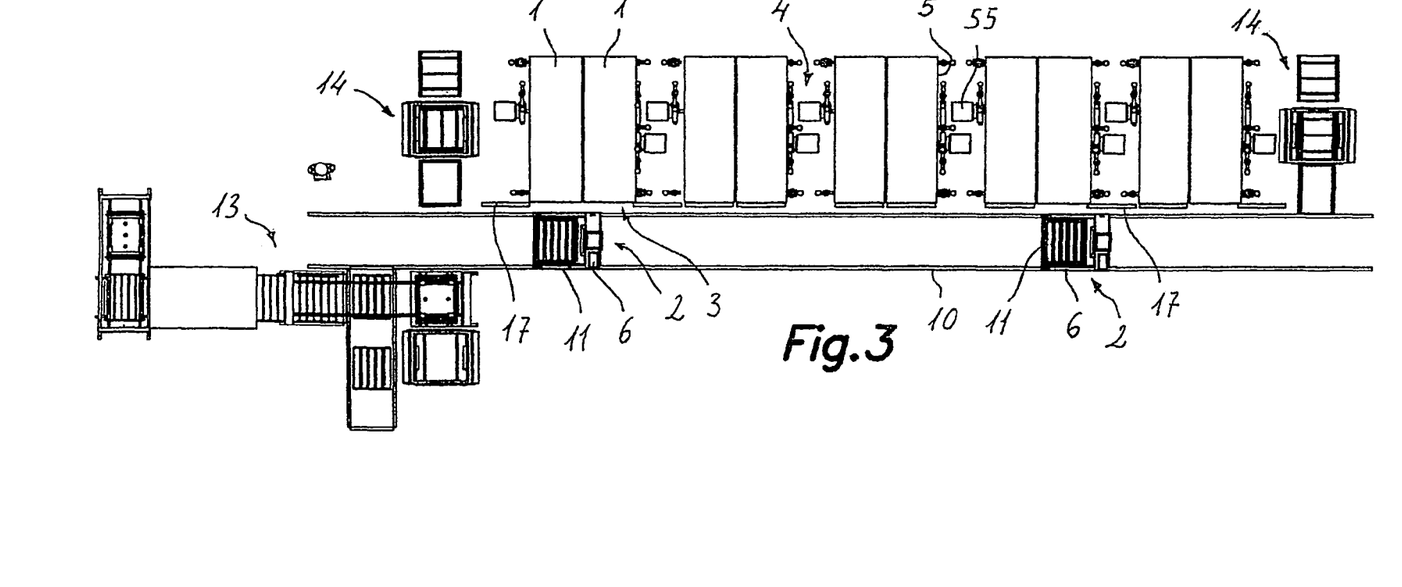

With reference first to FIGS. 1 to 3, the installation for the cooking of food items is the type comprising numerous cooking tanks 1 for receiving the food items to be cooked, together with the means for loading/unloading 2 the food items to/from the said cooking tanks 1. They are fitted with the means for conveying, driving and storing the liquids, which are described in detail below with reference to FIG. 11, for the selective and independent filling of each of the said cooking tanks 1 with liquids for the purpose of subjecting the food items they contain to successive baths for different periods of times and at different temperatures, with at least one of the said baths for cooking and for optionally returning the said liquids to their respective tanks. Each of the said cooking tanks 1 comprises at least one side opening 3 with the means for being hermetically sealed, through the side opening 3 the food items can be loaded/unloaded by the said means of loading/unloading 2, which comprises at least one transport/lift trolley 6 equipped with the means of handling capable of holding, raising and lowering a batch of food items and transferring said batch into one of the cooking tanks 1, or to remove it from the same tank through the opening 3. FIG. 1 shows two of the said trolleys 6, which move under their own power over rails 10 along the length of a path. The cooking tanks 1 are arranged forming a row along one side of the said path, with their side openings 3 aligned in a plane parallel to the same. The trolleys 6 can make selective stops in front of any of the cooking tanks 1 in order to introduce or remove a batch of food items from the tank under the control of programmable electronic means.

The shown installation includes a demoulding station 13 at one end, for the demoulding and distribution of cooked food items in the cooking tanks 1 by batches in stacked moulds 11, as will described later, although it could just a easily be an unloading station for receiving and distributing the food items cooked in batches according to other forms of loading. The rails 10 extend to the said demoulding station 13, so that the trolley 6 is able to remove and transport the said batches of cooked food items from any of the cooking tanks 1 to the demoulding station 13. The installation also includes at least one storage station 14 of loading platforms 24, which can be accessed by the trolleys 6 moving along the rails 10. These loading platforms are used for handling the batches and their description is also provided later.

Figure 4:
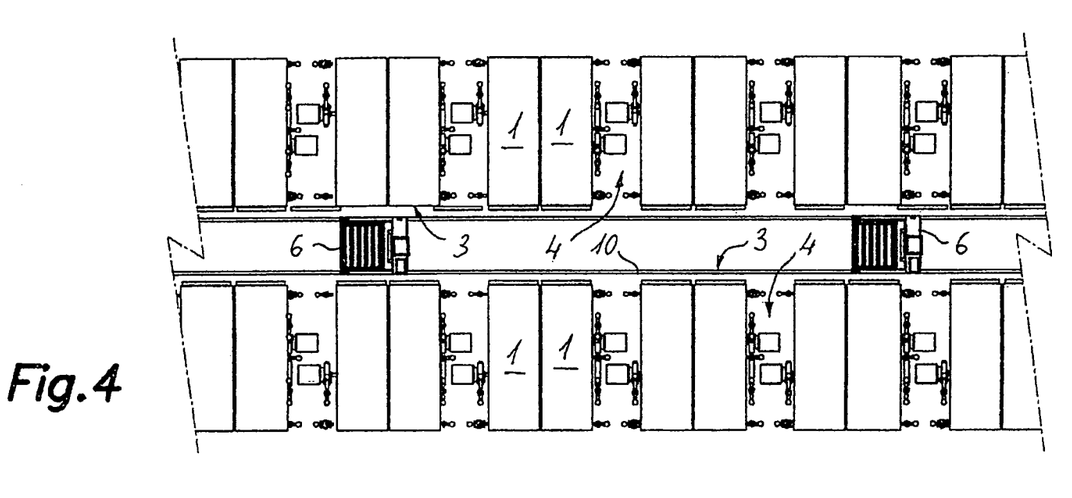
FIGS. 4 and 5 are plan views of another two possible variants of tank distribution in relation to the path for the means of loading/unloading.
Figure 5:
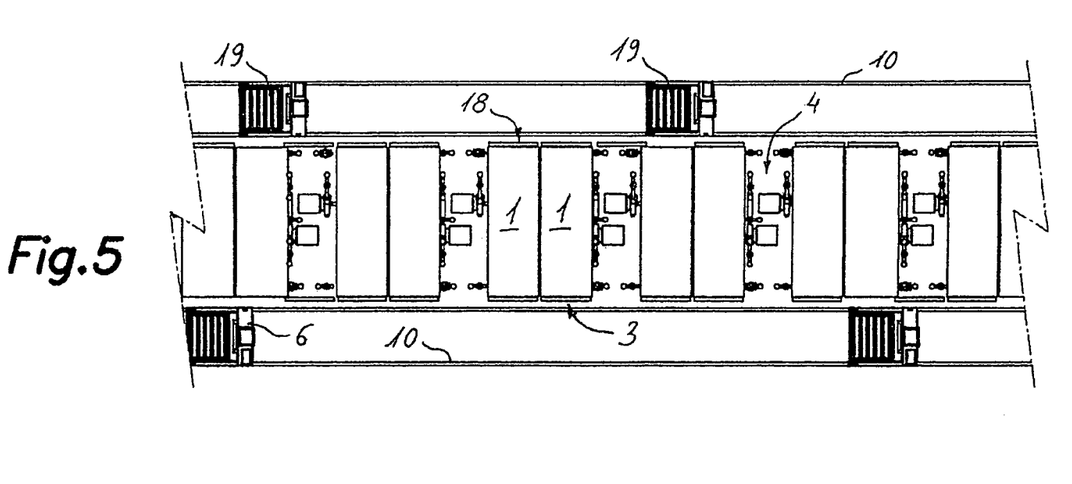

Although the distribution of FIGS. 1 to 3 has been demonstrated as being simple and fully efficient, other distributions are also possible. For example, FIG. 4 shows a distribution variant in which the cooking tanks 1 are arranged to form a second row facing the first one along the length of the side opposite the said path, with the openings 3 of the said second row also aligned in a plane parallel to the path. Thus, the cooking tanks 1 in both rows can be loaded/unloaded by the said transport/lifting trolleys 6, moving along a single path over the rails 10. Another possible variant is shown in FIG. 5, where the cooking tanks 1 include a second opening 18 on the side opposite the first opening 3, with the said second openings 18 aligned in a plane parallel to a second path along which a second set of transport/lifting trolleys 19 move. In this way, the cooking tanks 1 can be loaded/unloaded, without distinction, by each of the first and second openings 3 and 18, or preferably, loaded by means of one opening and unloaded by the other, for example, trolleys 6 moving along the first path always carry out loading operations via the first openings 3 and the trolleys 19, which move along the second path always perform unloading operations via the second set of openings 18.

Figure 6:
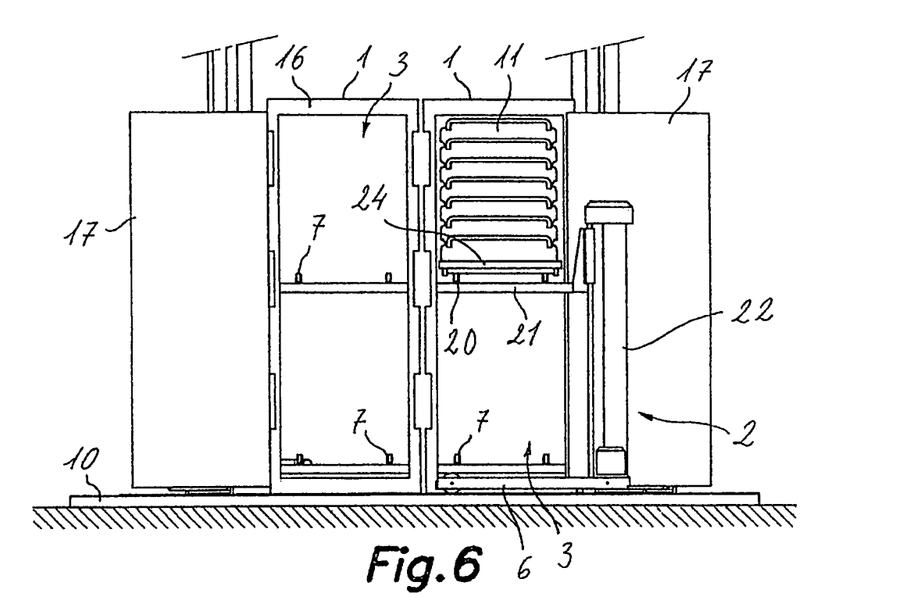
FIG. 6 is a front elevation view of a group of two side-by-side cooking tanks, together with the means of loading shown in the installation of FIG. 1.
Figure 7:
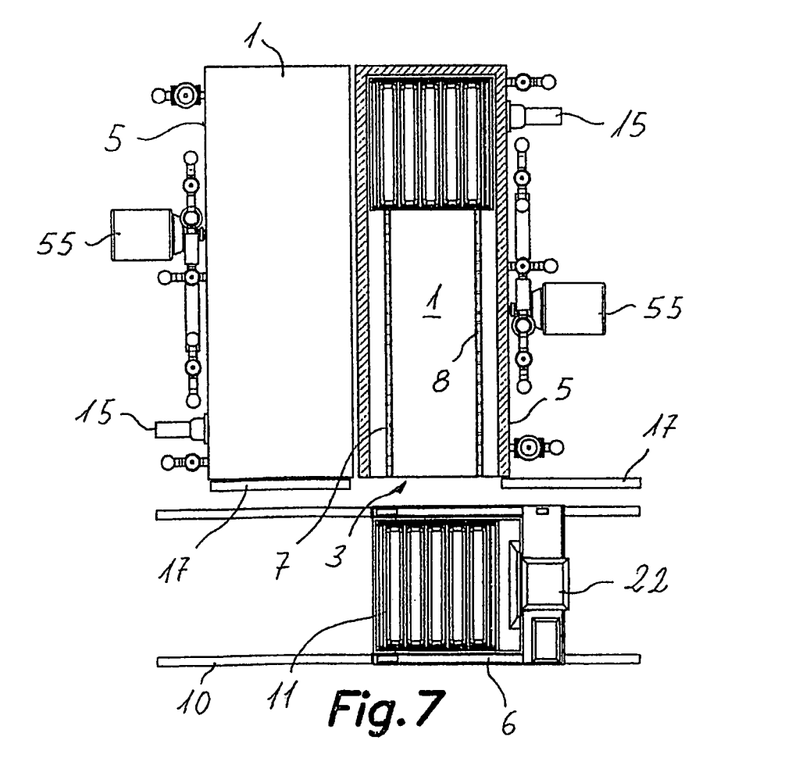
FIG. 7 is a plan view of a group of two side-by-side cooking tanks, together with the means of loading shown in FIG. 6, with one of the tanks cut away to show its interior.
Figure 9:
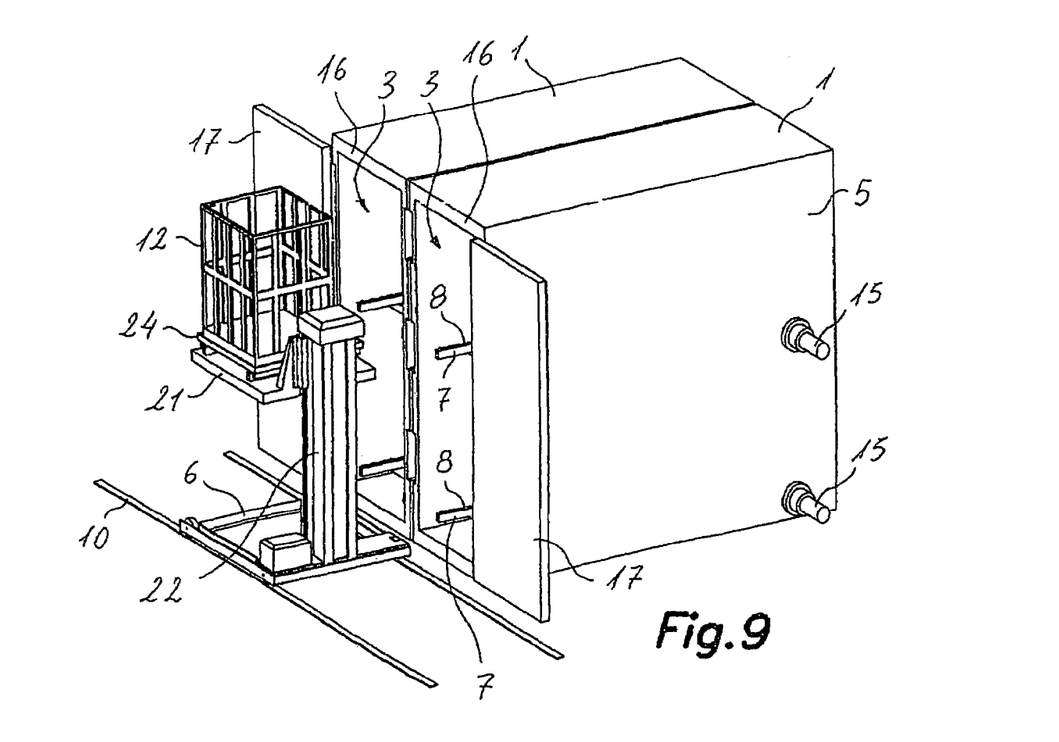
FIG. 9 is a view in perspective of a group of two cooking tanks side-by-side, with the means of transport adapted for transporting a batch of food items arranged in a cage.

As will be understood, the key aspect that makes operation possible of the loading/unloading means 2 of any of the previous distributions is the fact the cooking tanks 1 have the cited side openings 3, the design of which requires special attention and is shown better in FIGS. 6, 7 and 9. Thus, each of the side openings 3 comprises a closing panel 17 that extends in a substantially vertical plane and is able to cover the opening, with is delimited by a frame 16, which is joined to the cooking tank 1. The cited closing panel 17 has a lateral movement in the manner of a sliding door, in order to allow/prevent entry inside the cooking tanks 1 together with frontal movement towards the said frame 16 that surrounds this side opening in the tank in order to apply pressure to the means of hermetically sealing the tank between the closing panel 17 and the frame 16. As was stated earlier, the opening 3 is fitted with the means of being hermetically sealed that comprises a device (not shown) to fix the closing panel 17 in place in a closed position, applying sufficient pressure against the said means of sealing, together with the means of locking the closing panel 17 in the said closed position, controlled by a safety system, to prevent it from being opened while the internal conditions are not suitable, in other words, while there is still liquid inside the cooking tank 1. Preferably, the cited safety system is a double safety system comprised of, for example, a mechanical device and an auxiliary device. A suitable mechanical safety device would be a float (not shown) located close to the bottom of the cooking tank 1, where the float would prevent the closing panel 17 from being opened when there is a minimum amount of liquid remaining in the cooking tank 1. As an auxiliary safety device, for example, electronic, a level sensor may be employed which detects the presence of liquid inside the cooking tank 1 and generates a signal to block the opening of the closing panel 17 if the said presence of liquid is detected in the tank.

As can be seen in the views provided by FIGS. 1 to 5, the cooking tanks are installed side-by-side so that between each group of two cooking tanks 1 there is a separation space 4 with sufficient width to allow at least one complete opening movement of the closing panel 17 of opening 3 for one of the cooking tanks 1 adjacent to one of the said separation spaces 4. These separation spaces 4 also serve to house same of the said means of conveying, driving and storing the liquids and associated with inlet/outlet pipes for liquids to and from the cooking tank 1 through the said free side wall 5 of each cooking tank 1 adjacent to the separation space 4. The rows may include an indefinite number of tanks 1, and at the ends of the rows there may be a single tank, which, in this case, will preferable have the free side wall 5 adjacent to a separation space 4, or group of two tanks 1, in which case, the free side wall 5 of the last tank will be exposed and eventually fitted with a protective screen or casing (not shown) for its associated components.

Figure 8:
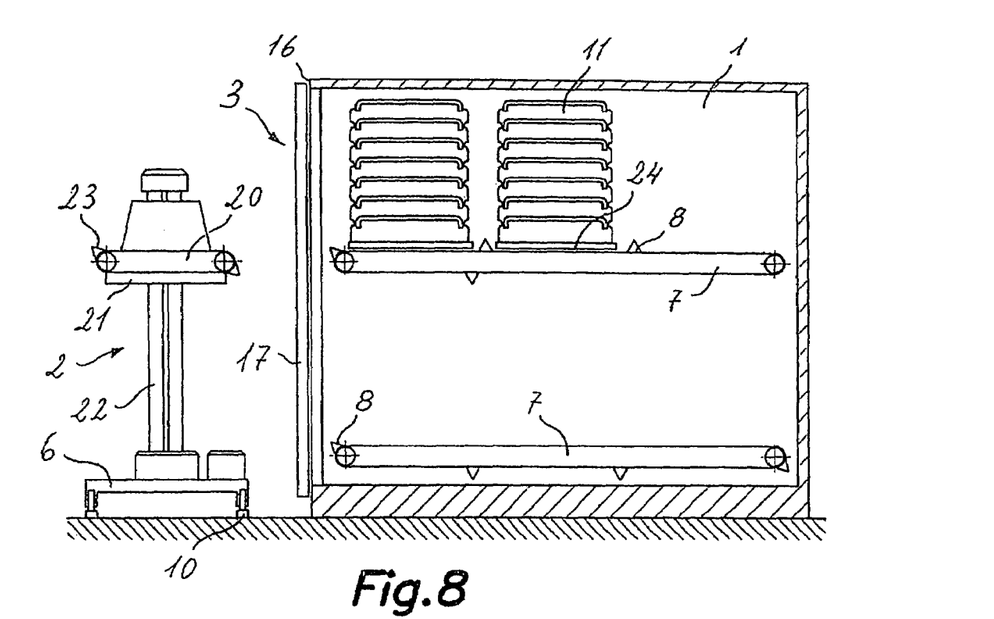
FIG. 8 is a cut away side elevation of a cooking tank showing the means of loading.

The means of loading/unloading 2 are described in detail below with reference to FIGS. 6 to 9. As was indicated previously, the trolley 6 includes the means of handling, which permit it to hold, raise and lower a batch of food items, and to transfer or remove the said batch to/from a cooking tank 1, in addition to the self-propelled translation movement of trolley 6 along the length of the rails 10. The said means of handling comprises a horizontal support element 21 connected to a vertical lift device 22, together with transversal guides 20 mounted on the said horizontal support element 21. The cited lift device 22 is able to place the said horizontal support element 21 at various suitable heights so that the said transversal guides 20 can be aligned with some corresponding guides 7 installed on one or more levels inside the cooking tank 1. For enhanced automation, just as shown in FIG. 8, the said transversal guides 20 for the means of handling the trolley 6 are associated with the means of drive 23 that cooperate with the means of drive 8 associated with the said cooking tank 1 guides 7 for introducing or removing a batch of food items into/from the same. The means of drive 8 for the guides 7 are driven by geared-motors 15 located outside on the said free side wall 5 of each cooking tank 1, for example, supported on the said free side wall 5 on each one, where the free side wall 5 is, in general, adjacent to one of the separation spaces 4. These geared-motors 15 are coupled to the means of drive 8 through the said free side walls 5 by of adequate means of dynamic sealing.

The installation comprises numerous loading platforms 24 adapted for use by the means of handling the trolley 6 described above. For this reason, the cited loading platforms have a specific configuration suitable for coupling by the said means of drive 8 and 23. The loading platforms 24 act in the way of pallets, so that a batch of food items can be loaded on each one, whether in stacked moulds 11 or in a cage 12 (FIG. 9), in which the food items are arranged in moulds, packages or individual wrappers, separated into layers by separator plates as is normal in the sector's techniques.

Thus, in the installations shown in FIGS. 1 to 5, the batches are loaded into stacked moulds 11 and a demoulding station 13 is included at one end of the rails 10, together with one or two loading platform 24 storage stations 14 at the end of the row or rows of cooking tanks 1. Evidently, an installation prepared to handle the batches of food items loaded into cages would have, for example, a reception, unloading and distribution station, instead of the demoulding station, but would similarly have one or more loading platform 24 storage stations 14.

Figure 10:
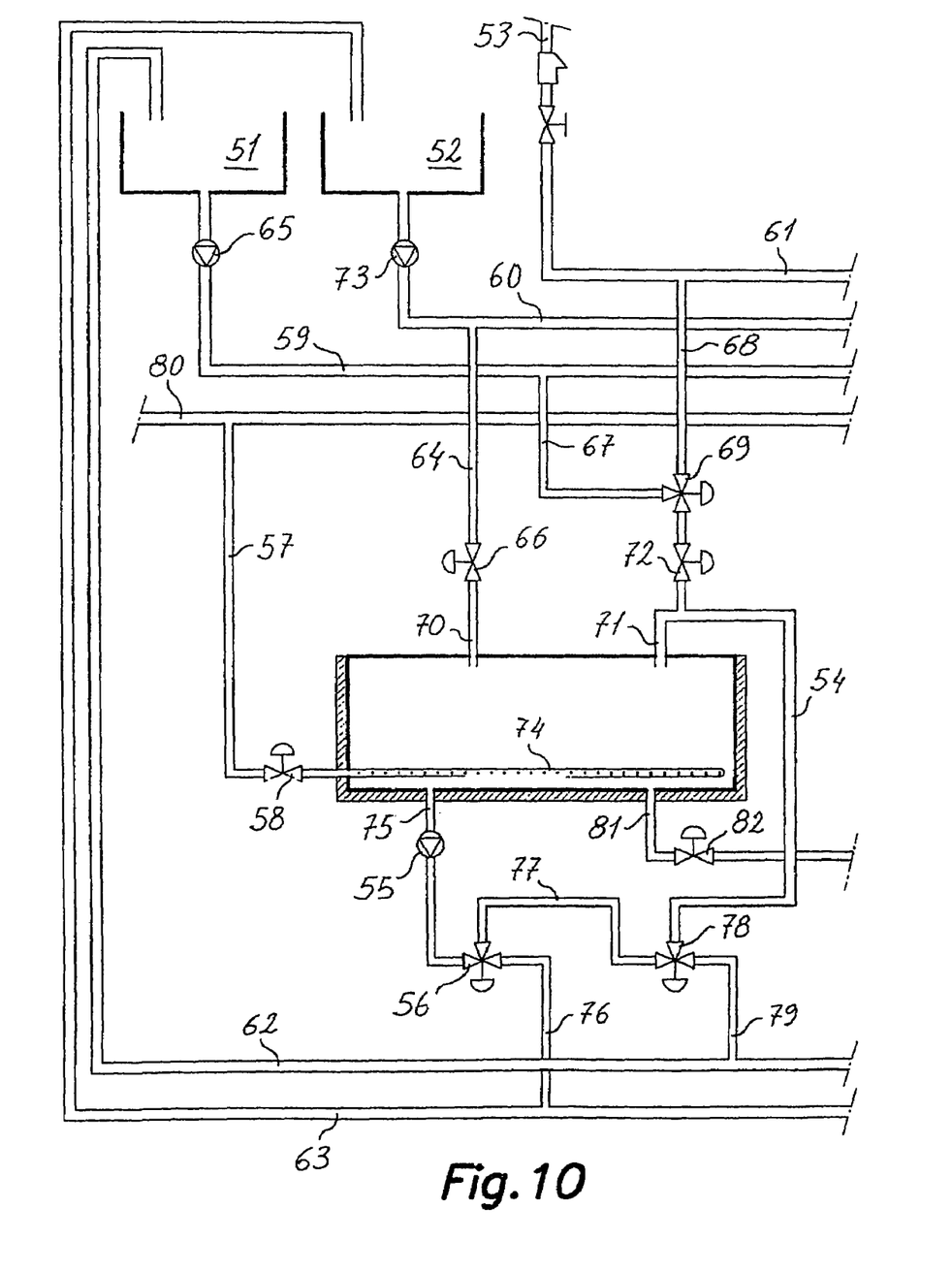
FIG. 10 is a circulation diagram of the liquids and the steam in the installation of this invention.

FIG. 10 shows a circulation diagram for the liquids in the installation of this invention. Thus, the installation comprises the means of heating the liquid (not shown) associated with a heated liquid tank 51, the means of cooling the liquid (not shown) associated with a cooling liquid tank 52 and the mains water supply connection 53. The common water is a liquid that is suitable for use as a heating liquid and a cooling liquid in the installation of this invention, with it being preferable to optionally add antifreeze, such as glycol, to the water that is employed as a cooling liquid in order to lower its freezing point. The cited heated liquid tanks 51 and that of the cooling liquid 52 have their respective outlets connected via their respective pumps 65 and 73a to the corresponding heated liquid manifold 59 and cooled liquid manifold 60, and the said mains water supply connection 53 is connected to a mains water supply manifold 61. In addition, a heated liquid collection pipe 62 leads to an inlet to the heated liquid tank 51 and a cooled liquid collecting pipe 63 leads to an inlet to the cooled liquid tank 52. The distribution pipes 59, 60, 61 and collector pipes 62 and 63 run along the length of the installation and supply liquids to each of the cooking tanks 1 and collect the liquids emptied from the same tanks in order to recycle them back to their respective tanks. FIG. 10 only shows the diagram for a single tank, which is repeated for the other cooking tanks 1.

A connection 64 is taken from the cooled liquid manifold 60 directly to inlet 70 on cooking tank 1, and on which connection 64 is mounted a cooled liquid inlet valve 66. A connection 67 is taken from the heated liquid manifold 59 and leads to manifold valve 69, with a connection 68 which is taken from mains water supply manifold 61, from which a single pipe is taken to another inlet 71 on the cooking tank 1 via an inlet valve 72. With this arrangement, each cooking tank 1 can be filled individually with cooled liquid, heated liquid, mains water or a mixture of the last ones.

The cooking tank 1 includes a steam inlet branch 57, which is derived from a steam manifold 80 connected to a steam source and with a duly controlled valve 58 in order to mix the steam, with heated liquid from the said heated water tank 51, mains water from the said mains water supply connection 53 or a mixture of them, inside the cooking tank 1 in order to raise its temperature to a required level under the control of some programmable electronic means. Inside the cooking tank 1, the steam is taken through a series of strategically positioned perforated pipes 74, through which the steam bubbles into the liquid that is present in the cooking tank. With this, for example, a pre-cook bath may be produced by filling the cooking tank 1 with mains water at environmental temperature and then raising the temperature inside the tank be bubbling steam through until an adequate level of approximately 50-60° C., or a cooking bath by filling the cooking tank with liquid previously heated by the means of heating to approximately 40-50° C. and then raising the temperature inside the cooking tank 1 by bubbling steam through until a suitable value of approximately 70-80° C. is attained. The use of steam to complete the heating of the liquid in the cooking tank involves a considerable savings in energy costs with respect to a system that completely heats the liquid by conventional means and maintains it at the required temperature in the heated liquid tank 51.

The cooking tank has an outlet 75 connected to a first distribution valve 56 via drive pump 55. A branch connection 76 leaves the said distribution valve 56 and is connected to the said cooled liquid manifold 63 and another branch connection 77 that leads to a second distribution valve 78 from which branch connection 79 leaves and is connected to the said heated liquid manifold 62 and another branch connection 54 that leads back to the cooking tank 1 liquid inlet 71.

Through the combination of both distribution valves 56 and 78, the liquid that leaves the cooking tank 1 can be returned to the cooled liquid tank 52 by the cooled liquid manifold 63, can be returned to the heated liquid tank 51 by the heated liquid manifold 62 or can be recycled back to the cooking tank 1 inlet 71. The latter is especially useful when using heated liquid that is subjected to steam action in order to obtain a uniform temperature throughout the liquid inside the tank, thus avoiding possible differences of temperature in the various tank zones. A drain outlet 81 fitted with a valve 82 is included for the situation in which it is necessary to empty the tank without returning the liquid to any of the tanks.

Figure 11:
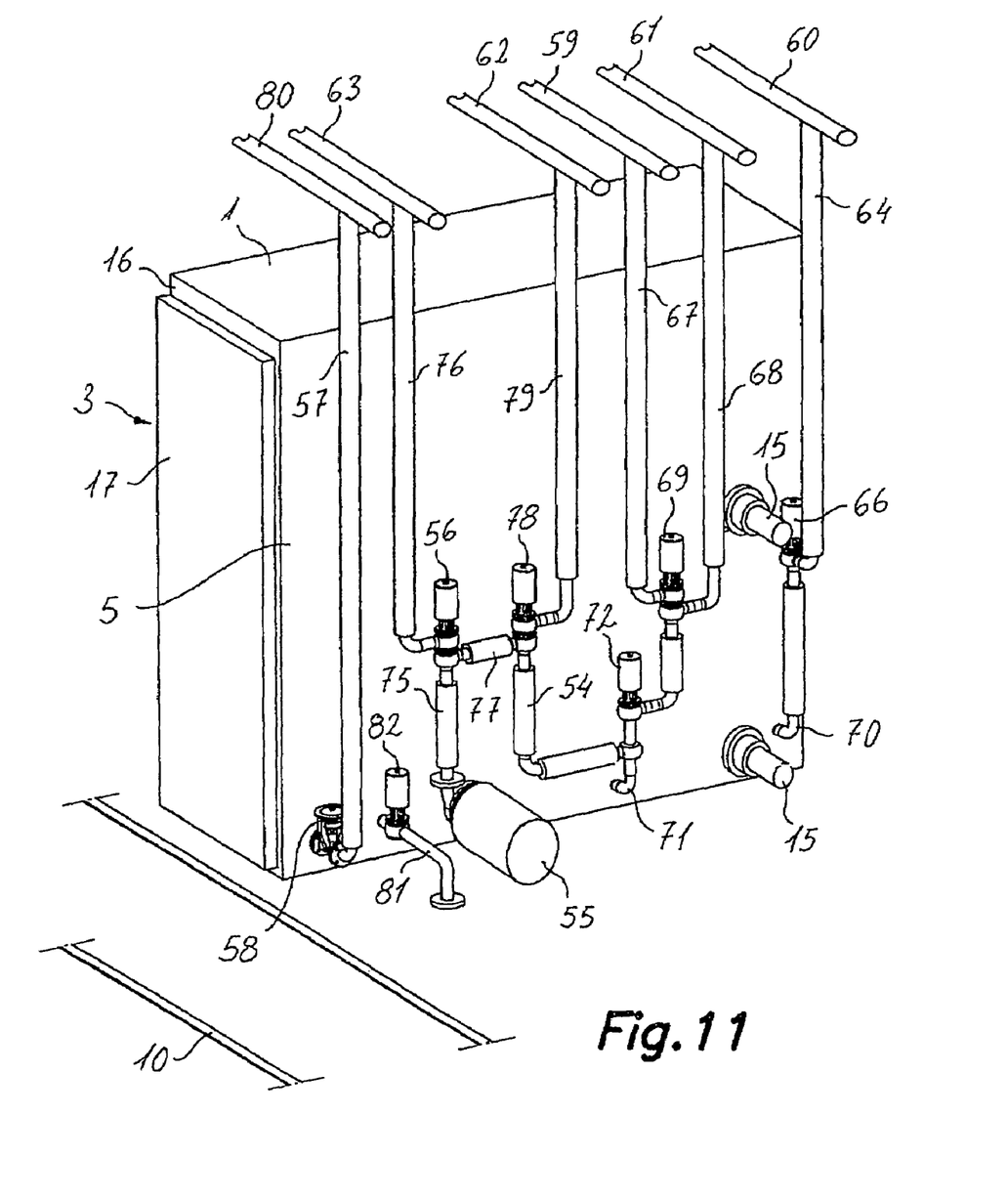
FIG. 11 is a perspective view of a cooking tank showing it free side wall.

Finally, FIG. 11 shows a free wall 5 of a cooking tank 1, on which the cited geared motor assemblies 15 are installed for the drive means 8 associated with the guides 7 (see FIG. 8), together with some of the cited means of conveying, driving and storing the liquids and steam. A steam manifold pipe 80 can be seen above the cooking tank, from which the steam inlet branch connection 57 leaves and is connected to a steam inlet via valve 58 and the said cooled liquid manifold pipe 60 that leaves the cited branch connection 64 that is connected to the said inlet 70 via valve 66. The heated liquid manifold pipe 59 and mains water 61 can also be seen and from which the respective branch connections 67 and 68 leave and that are connected to the cited inlet 72 via manifold valve 69. Tanks 51 and 52 and pumps 65 and 73 are not shown in FIG. 11. The liquid outlet 75 is connected by means of the pump 55 to the first distribution valve 56 from which branch connection 76 leaves to be connected to the cited cooled liquid manifold 63 and the other branch connection 77 that leads to the cited second distribution valve 78 from which branch connection 79 leaves and is connected to the cited heated liquid manifold 62 and branch connection 54, which leads back to liquid inlet 71 on the cooking tank 1 in order to establish a liquid recirculation system. Another outlet 81 is connected to a sump via a valve 82. The distributor pipes 59, 60, 61 and 80 and the collector pipes 62 and 63 run along the length of the installation above the cooking tanks 1, and each cooking tank 1 has an equivalent layout of components connected to them.

Although certain specific construction examples have been described and illustrated, an expert in the material would be able to introduce multiple variations to these without leaving the scope of the invention, which is defined by the attached claims.

The invention claimed is:

1. A food cooking installation, of the type comprising:
    a plurality of cooking tanks to receive food items to be cooked;
    loading/unloading means for loading/unloading the food items into/from said cooking tanks;
    liquid heating means associated with a heated liquid tank, liquid cooling means associated with a cooled liquid tank, and a connection to a mains water supply;
    liquid conveying, driving and storing means being provided connecting said heated liquid container, said cooled liquid container and said mains water supply to said cooking tanks in order to independently fill and empty said cooking tanks, with the ability of said liquids to be returned to their respective tanks, and to subject the contained food items in the cooking tanks to successive baths for different periods of time and at different temperatures, at least one of said baths being a cooking bath and another a cooling bath, wherein, each of said cooking tanks comprises at least one side opening provided with hermetic closing means, with the food items being able to be loaded/unloaded through said side openings by said loading/unloading means, wherein said hermetic closing means comprises a sliding closing panel that extends in a substantially vertical plane, said closing panel being arranged to perform a sideways movement to allow/prevent entry inside the cooking tanks, and a frontal movement towards a frame that surrounds said side opening in the tank in order to order to apply pressure to sealing means arranged between the closing panel and said frame.

2. An installation in accordance with claim 1, wherein said wherein said opening hermetic closing means further comprises a device to fix the closing panel in a closed position, applying adequate pressure against said sealing means, and blocking means controlled by at least one safety system in order to lock the closing panel in said closed position and prevent it from being opened while the environmental conditions inside the tank are not suitable.

3. An installation in accordance with claim 2, wherein said safety system comprises a float located close to the bottom of the cooking tank, where the float blocks the opening of the closing panel when there is a minimum amount of liquid remaining in the cooking tank.

4. An installation in accordance with claim 3, further comprising an auxiliary safety device that includes means of detecting the presence of liquid inside the cooking tank, where the means of detection block the opening of the closing panel if said presence of liquid is detected in the tank.

5. An installation in accordance with claim 1, wherein said loading/unloading means for loading/unloading the food items to/from said cooking tanks comprises at least one transport/lifting trolley fitted with handling means capable of holding, lifting and lowering a food item batch and of transferring said food item batch inside one of the cooking tanks at a specific level or to remove it therefrom through said opening, where the transport/lifting trolley is moved along at least one path along the length of at least one side which said cooking tanks are arranged forming at least one row, with their openings aligned in a plane parallel to said path.

6. An installation in accordance with claim 5, wherein said cooking tanks are further arranged to form a second row facing the first one along the length of the opposite side said path, with the openings of said second row also aligned in a plane parallel to the cited path, so that the cooking tanks in both rows can be loaded/unloaded by said at least one transport/lifting trolley.

7. An installation in accordance with claim 5, wherein each of said cooking tanks (1) includes a second opening on the side opposite the first opening, said second openings being aligned in a plane parallel to a second path along which at least one second transport/lifting trolley, so that the cooking tanks can be loaded/unloaded indistinctly through each of the first and second openings, or loaded through one and unloaded through the other.

8. An installation in accordance with claim 5, wherein said cooking tanks are, at least in an intermediate zone of said row, laterally grouped two by two, with each cooking tank having a free side wall, and separation gaps being formed between each two of said free side walls, said separation gaps having a sufficient width to permit at least the complete opening movement of the closing panel for the opening of one of the cooking tanks adjacent to one of said separation gaps, with some of said liquid conveying, driving and storing means being arranged on the free side wall of each cooking tank and associated with liquid inlet and outlet pipes to the cooking tank through said free side wall.

9. An installation in accordance with claim 5, wherein said at least one trolley is self-propelled and moves over rails along said path, and is able to make selective stops in front of any of the cooking tanks that is selected for introducing or removing a batch of food items under the control of programmable electronic means.

10. An installation in accordance with claim 5, wherein said handling means associated with the trolley for holding, raising and lowering a batch of food items and for introducing or removing said batch from a cooking tank comprises a horizontal support element connected to a vertical lift device, and transversal guides mounted on said horizontal support element, said lift device being able to place said horizontal support element at various suitable heights so that said transversal guides are aligned with corresponding guides installed at one or more levels inside the cooking tank.

11. An installation in accordance with claim 10, wherein said transversal guides of the trolley handling means are associated with driving means that cooperate with drive means associated with said cooking tank guides for introducing or removing a batch of food items into/from the same.

12. An installation in accordance with claim 11, wherein said driving means of the guides are driven by motors located outside of each cooking tank, said motors being coupled to the driving means through one of said free side walls in cooperation with dynamic sealing means.

13. An installation in accordance with claim 11, further comprising a plurality of load platforms adapted to be used by the trolley handling means, including a configuration suitable to be coupled by said driving means, a batch of food items being able to be loaded above each of the load platforms, either arranged in stacked moulds or inside a cage in which the food items are arranged in moulds, packages or individual wrappers, which are generally separated into layers by means of spacer plates.

14. An installation in accordance with claim 13, further including a demoulding station for demoulding food items cooked in the cooking tanks by batches in stacked moulds, with said rails extending to said demoulding station, so that the trolley can remove said batches of cooked and cooled food items from any of the cooking tanks and transport them to the demoulding station.

15. An installation in accordance with claim 13, further including at least one load platform storage station that is accessible to the trolley moving along the rails.

16. An installation in accordance with claim 1, wherein each cooking tank includes at least one stem inlet connected to a steam supply via a valve that is controlled to mix steam with either heated liquid from said heated liquid tank or mains water from said mains water supply mains connection, or a mixture of the two, inside the cooking tank in order to raise the temperature to the required level under the control of programmable electronic means.

17. An installation in accordance with claim 1, further including liquid recirculating means driven by a pump between an outlet and an inlet of the cooking tank in order to homogenize the liquid temperature inside the tank and thus prevent any possible temperature differences in different zones of the same.

18. A food cooking installation, comprising:
a plurality of cooking tanks to receive food items to be cooked;

means of loading/unloading the food items into/from said cooking tanks;

means of heating a liquid associated with a heated liquid tank;

means of cooling a liquid associated with a cooled liquid tank and a connection to a mains water supply;

means of conveying, driving and storing the liquids, which are connected to a heated liquid container, a cooled liquid container and a mains water that are connected to said cooking tanks so that said cooking tanks can be independently filled and emptied, with said liquids being optionally returned to their respective tanks, and the contained food items in the cooking tanks can be subjected to successive baths for different periods of time and at different temperatures, with at least one of said baths being a cooking bath and another for cooling, wherein each of said cooking tanks comprises at least one side opening with means for being hermetically sealed, so that the food items can be loaded/unloaded through which side openings by said means of loading/unloading, wherein the means of hermetically sealing comprises a sliding closing panel that extends in a substantially vertical plane, with said closing panel having sideways movement to allow/prevent entry inside the cooking tanks, together with frontal movement towards a frame that surrounds said side opening in the tank in order to apply pressure to the means of hermetically sealing the tank between the closing panel and the frame, and wherein the means of hermetically sealing the opening also comprises a device to fix the closing panel in a closed position, applying adequate pressure against said means of hermetically sealing and the means of blocking this, controlled by at least one safety system, in order to lock the closing panel in said closed position and prevent it from being opened while the environmental conditions inside the tank are not suitable.

19. A food cooking installation, comprising:

a plurality of cooking tanks to receive food items to be cooked;

means of loading/unloading the food items into/from said cooking tanks;

means of heating a liquid associated with a heated liquid tank;

means of cooling a liquid associated with a cooled liquid tank and a connection to a mains water supply;

means of conveying, driving and storing the liquids, which are connected to a heated liquid container, a cooled liquid container and a mains water that are connected to said cooking tanks so that said cooking tanks can be independently filled and emptied, with said liquids being optionally returned to their respective tanks, and the contained food items in the cooking tanks can be subjected to successive baths for different periods of time and at different temperatures, with at least one of said baths being a cooking bath and another for cooling, wherein each of said cooking tanks comprises at least one side opening with means for being hermetically sealed, so that the food items can be loaded/unloaded through which side openings by said means of loading/unloading, wherein the means of hermetically sealing comprises a sliding closing panel that extends in a substantially vertical plane, with said closing panel having sideways movement to allow/prevent entry inside the cooking tanks, together with frontal movement towards a frame that surrounds said side opening in the tank in order to apply pressure to the means of hermetically sealing the tank between the closing panel and the frame, wherein said means of loading/unloading, for loading/unloading the food items to/from said cooking tanks, comprises at least one transport/lifting trolley fitted with handling means capable of holding, lifting and lowering a food item batch and of transferring said food item batch inside one of the cooking tanks at a specific level or to remove it through said opening, where the transport/lifting trolley will move along at least one path along the length of at least one side along which said cooking tanks are arranged, forming at least one row, with their openings aligned in a plane parallel to said path, and wherein said cooking tanks are also arranged to form a second row facing the first one along the length of the side opposite said path, with the openings of said second row also aligned in a plane parallel to the cited path, so that the cooking tanks in both rows can be loaded/unloaded by said at least one transport/lifting trolley.

20. A food cooking installation, comprising:

a plurality of cooking tanks to receive food items to be cooked;

means of loading/unloading the food items into/from said cooking tanks;

means of heating a liquid associated with a heated liquid tank;

means of cooling a liquid associated with a cooled liquid tank and a connection to a mains water supply;

means of conveying, driving and storing the liquids, which are connected to a heated liquid container, a cooled liquid container and a mains water that are connected to said cooking tanks so that said cooking tanks can be independently filled and emptied, with said liquids being optionally returned to their respective tanks, and the contained food items in the cooking tanks can be subjected to successive baths for different periods of time and at different temperatures, with at least one of said baths being a cooking bath and another for cooling, wherein each of said cooking tanks comprises at least one side opening with means for being hermetically sealed, so that the food items can be loaded/unloaded through which side openings by said means of loading/unloading, wherein the means of hermetically sealing comprises a sliding closing panel that extends in a substantially vertical plane, with said closing panel having sideways movement to allow/prevent entry inside the cooking tanks, together with frontal movement towards a frame that surrounds said side opening in the tank in order to apply pressure to the means of hermetically sealing the tank between the closing panel and the frame, wherein said means of loading/unloading, for loading/unloading the food items to/from said cooking tanks, comprises at least one transport/lifting trolley fitted with handling means capable of holding, lifting and lowering a food item batch and of transferring said food item batch inside one of the cooking tanks at a specific level or to remove it through said opening, where the transport/lifting trolley will move along at least one path along the length of at least one side along which said cooking tanks are arranged, forming at least one row, with their openings aligned in a plane parallel to said path, and wherein said means of handling associated with the trolley for holding, raising and lowering a batch of food items and for introducing or removing said batch from a cooking tank, comprises a horizontal support element connected to a vertical lift device, together with transversal guides mounted on said horizontal support element, with said lift device being able to place said horizontal support element at various suitable heights so that said transversal guides are aligned with some corresponding guides installed on one or more levels inside the cooking tank.

* * * * *